Oct. 9, 1945.   R. J. S. PIGOTT   2,386,572
METALWORKING MACHINE
Filed Feb. 25, 1942
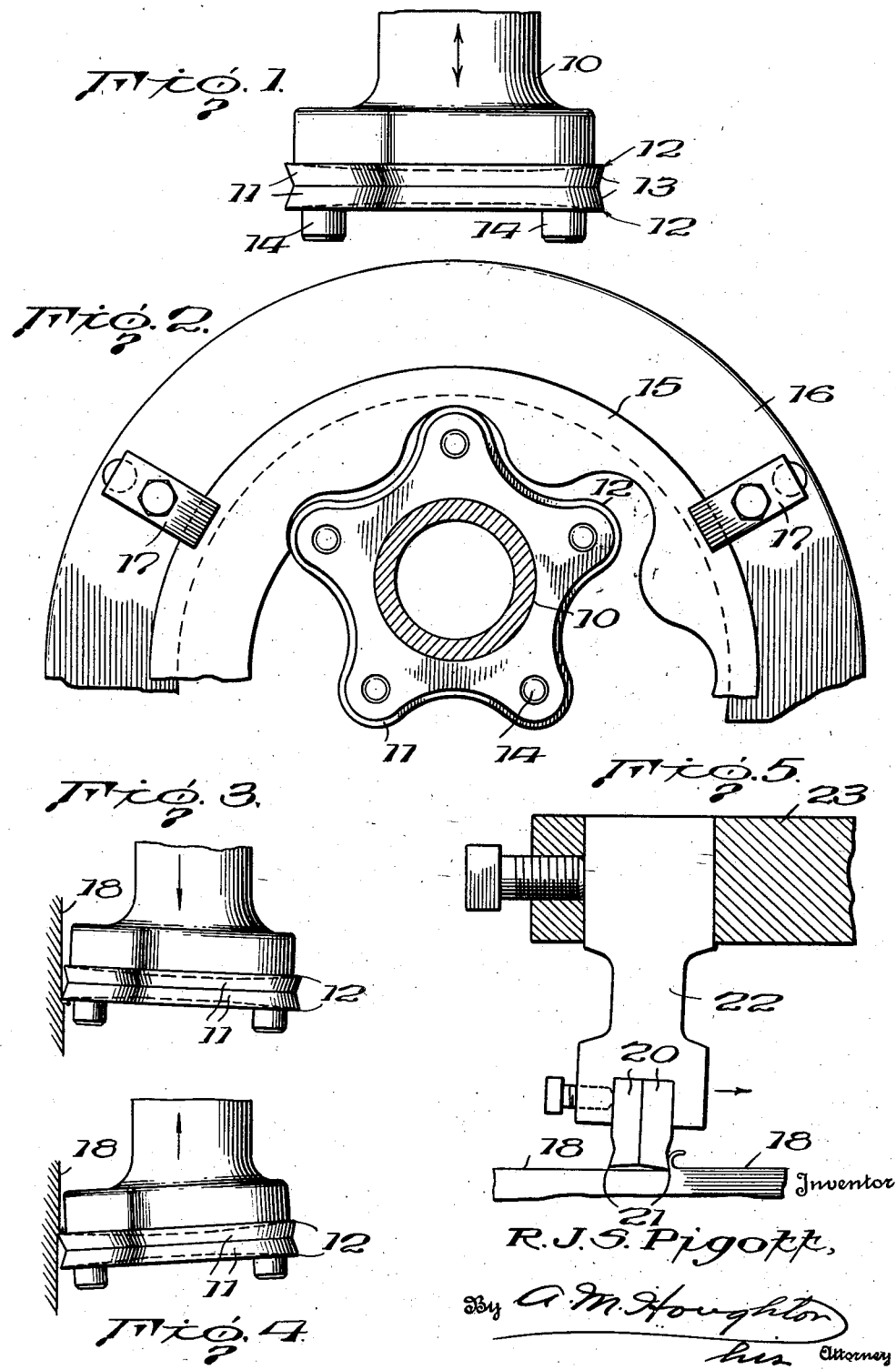

Patented Oct. 9, 1945

2,386,572

UNITED STATES PATENT OFFICE 2,386,572

METALWORKING MACHINE

Reginald J. S. Pigott, Pittsburgh, Pa., assignor to Gulf Research & Development Company, Pittsburgh, Pa., a corporation of Delaware Application February 25, 1942, Serial No. 432,336

1 Claim. (Cl. 90—53)

This invention relates to improvements in metal working machines.

Gear shapers of the generation type such as the well-known Fellows shapers employ a cutter, shaped like a gear, which is reciprocated through an annular blank (in the case of making internal gears) while the cutter and blank are gradually rotated about eccentric axes at the appropriate speed ratio. In general the cutter must have less teeth than the gear, at least two or three less, to afford adequate clearance of the blank. In cutting internal gears of as low a number of teeth as seven or eight it is not possible to get a difference in number of teeth between the gear and the cutter of more than two or three, and with some gear tooth shapes, notably the logarithmic spiral shape (Pigott Patents 1,909,117 and 2,222,515) interference between the tool and the blank occurs on the non-cutting stroke. Ordinarily, machines of the Fellows type take a cutting stroke downward (sometimes it is upward) and during the return stroke when no cutting is done, the tool is pulled back from the work a few thousandths to $\frac{1}{32}$ inch so as to avoid any rubbing of the cutting edge of the cutter on the work. In cases where the internal gear and the cutter have interlocking angles, as the tool pulls back the cutter bears heavily against the tooth of the blank. This may result in burning the cutter and spoiling the work since on the return stroke the cutting edge of the cutter is turned in the wrong direction with no opportunity to cut itself clear. As the feed in such types of machine is continuous throughout 360° rotation of the work and cutter, the normal position of the cutting tooth on the upstroke, unless pulled back, may be actually inside the position where the metal has not yet been removed and a very heavy rub results. Ordinarily, both in Fellows gear shapers and in slotters, shapers, and planers, the tool is relieved from the work on the non-cutting stroke so as to avoid burning action. In the Fellows gear shaper, this is accomplished by pulling back the whole tool supporting and operating mechanism and in shapers and planers by hinging the tool holder so it lifts off the work and the tool merely rides on the work by its own weight with no other pressure.

Among the objects of the present invention is the provision of a shaping tool which cuts in both directions and which is adapted for operation without pullback because of the yieldability of its holder or support in all directions normal to the axis thereof, whereby rubbing is prevented and cutting is speeded. Another object is the provision of a cutter for internal gears capable of cutting gears as small a number as only two or three more teeth than on the cutter, without rubbing or burning actions.

These and other objects are achieved by the provision of a cutter having oppositely facing cutting edges, advantageously embodied in two separate but identical plates secured to a spindle, and arranged to cut a blank in both directions of reciprocation of the spindle or holder. The cutter can be operated with no pullback whatever, in which case the invention makes possible generation of gears quite precisely conjugate to the cutter. When pullback is used, however, to avoid interference the cutter can be suitably modified to prevent over-cutting. Even in this case the double-edge cutter is found to free itself by cutting whatever parts interfere.

In the accompanying drawing there is shown more or less diagrammatically an example of a specific embodiment of apparatus within the purview of the invention. In the drawing, Fig. 1 is a view in elevation of the mounted cutter assemblage, Fig. 2 is a plan view corresponding to Fig. 1 and showing the cutter engaging a blank, Figs. 3 and 4 are views similar to Fig. 1 illustrating the behavior of the cutter on the upstroke and the downstroke, and Fig. 5 is a view partly in side elevation, partly in section, of a modification of the invention embodied in a planer.

Referring to the drawing, Figs. 1 to 4, the machine includes a holder 10 adapted to be reciprocated and rotated by means not shown and carrying two identical cutter elements 11, slightly concave and relieved behind their cutting edges 12 as shown at 13 and solidly secured to the holder by bolts 14. The portion of the holder which supports the cutters is shaped like the cutters but slightly smaller, as shown, to give firm support. The shape of the cutting edges is such that it will correctly generate teeth and tooth spaces for the gear to be cut. In Fig. 2 the cutter is shown in the process of cutting a ring gear from an annular blank 15, rotated on a suitable platform 16 to which it is firmly gripped by clamps 17. The platform is rotated at a speed which is to the cutter rotation speed as the number of teeth desired on the ring gear is to the number of teeth on the cutter.

The contour of the cutters is determined by known principles; see for example my acknowledged prior Patent 2,222,515. In general the cutter shape is quite similar to that of a gear of the series having the same number of teeth.

Two actions take place in this double-edge cutter which avoid burning. The first is that since the leading edge in either direction of movement is the cutting edge, the trailing or non-cutting edge will only press on the work 18 (Figs. 3 and 4) by the amount of spring-back of the metal from under the cut, and this is negligibly small; of the order of 0.0001 or 0.0002 inch. With lubrication applied to the work, the trailing cutter will not be pressed heavily enough against the work by this action to cause burning, but there is a second action which also assists in this operation quite noticeably, as shown in Figs. 3 and 4. In actual practice the holder or spindle 10 which properly rotates the cutter in synchronism with the work has an appreciable spring under the cutting strokes. In the down motion, since the resistance is applied at some distance from the center of this shaft, the bending action is as is shown (with exaggeration for clarity) in Fig. 3. On the return stroke when the opposite edge is cutting, the spring is in the opposite direction as shown in Fig. 4. In each case the effect is to relieve the trailing or non-cutting edge of the cutter from any pressure against work.

The machine has other advantages beside that of avoiding interference and burning. The cutting edges, which are the only parts of the tool to wear are in the form of thin pieces separate from the holder or supporting member so that the entire holder assembly need not be renewed when the cutting edges are worn out or ground down below size. Moreover the actual cutting members are sufficiently thin so that they may be conveniently formed in a profiling machine from a model, as in a Keller engraving machine or pantograph engraving machine and the contours may thus be very cheaply produced with very high precision. Both cutters are identical in dimensions so that one setup for grinding the contour will serve for both. The invention is not limited to making the cutters in two thin plates; both cutting edges can be formed integral with the holder. From a practical point of view the separate construction described is better.

Since this cutter cuts on both strokes, it is possible to increase the rate of feed in the gear cutting machine, thus increasing the speed with which gears are cut without any additional stress being placed upon the cutting edge or the machine. The idle return stroke is made useful for cutting.

The invention can be applied to shapers, planers, and slotters, so as to utilize the return stroke which is normally unused for cutting. Such an embodiment is shown diagrammatically in Fig. 5. A pair of blades 20 with oppositely directed cutting edges 21 is mounted in a holder 22 mounted in turn on a reciprocating member 23.

The edges alternately engage work 18 in the two directions of reciprocation. There is enough resilience in the holder (as shown to an exaggerated degree in the drawing) to avoid any burning action on either cutting edge when moving in non-cutting direction.

What I claim is:

In a metal working machine adapted to cut a blank in both directions of reciprocation of a cutter, a cutter holder comprising a resiliently yieldable shank portion secured at one end to a reciprocable tool support and having means at its opposite end for rigidly mounting thereon a pair of of similarly profiled cutting edges facing outwardly away from each other, the resiliency of said shank portion being such that said outwardly facing cutting edges alternately engage the work in the two directions of reciprocatory movement, and in each direction the trailing cutter is relieved of detrimental pressure on the work by reason of the bending of said shank under the resistance of the work to the advancing cutter.

REGINALD J. S. PIGOTT.